United States Patent [19]
Von Pfeil et al.
[11] 3,769,466
[45] Oct. 30, 1973

[54] TELEPHONE TRANSMISSION SYSTEM WITH ECHO SUPPRESSORS

[75] Inventors: Dirsko Von Pfeil, Munich; Johann Sontheim, Feldafing, both of Germany

[73] Assignee: Siemens Aktiengesellschaft, Berlin & Munich, Germany

[22] Filed: Oct. 12, 1971

[21] Appl. No.: 187,989

[30] Foreign Application Priority Data

Oct. 14, 1970 Germany .................. P 20 50 462.5

[52] U.S. Cl. .......................... 179/170.4, 179/170.2
[51] Int. Cl. ............................................ H04b 3/20
[58] Field of Search ...................... 179/170.4, 170.2, 179/170.6, 170.8

[56] References Cited

UNITED STATES PATENTS

| | | | |
|---|---|---|---|
| 2,990,457 | 6/1961 | Hall et al. | 179/170.4 |
| 3,647,993 | 3/1972 | Foulkes et al. | 179/170.2 |

*Primary Examiner*—Kathleen H. Claffy
*Assistant Examiner*—Alan Faber
*Attorney*—Carlton Hill et al.

[57] ABSTRACT

A telephone transmission system in which two transit time sections including speech circuits and respective echo suppressors are connected on a four-wire basis in an exchange which provides an echo suppressor for each of the connected circuits. The exchange is provided with apparatus for suprressing signals in the transmitting path including a switch off device having a control sound generator connected to a transmission path and a control sound receiver connected to the other transmission path for switching off an intermediate echo suppressor in response to control sound received over the associated transmission path.

3 Claims, 5 Drawing Figures

Figure 1A:
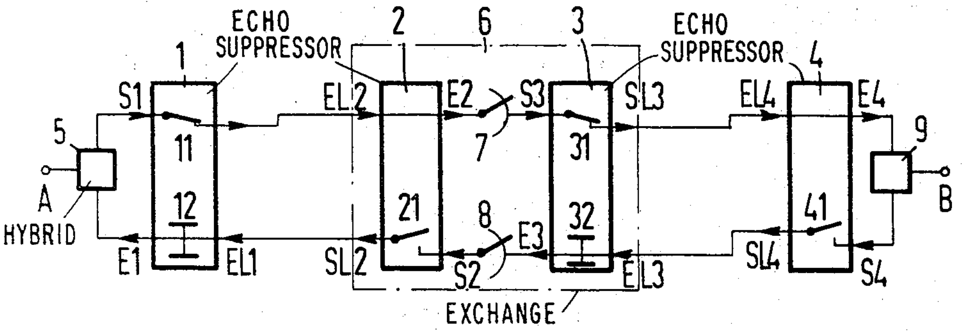

INVENTORS
Dirsko von Pfeil
Johann Sontheim

BY Hill, Sherman, Meroni, Gross & Simpson ATTYS.

INVENTORS
Dirsko von Pfeil
Johann Sontheim

BY Hill, Sherman, Meroni, Gross & Simpson
ATTYS.

TELEPHONE TRANSMISSION SYSTEM WITH ECHO SUPPRESSORS

DESCRIPTION

This invention relates to a telephone transmission system in which two four-wire speech circuits each having an echo suppressor are connected together in an exchange which provides an echo suppressor for each line.

With worldwide information connections, it may happen that two transit time transmission lines each having an echo suppressor are connected together through an exchange which provides an additional echo suppressor for each line. This happens, for example, in connection with long distance or intercontinental connections, with satellite paths, or with two satellite paths which are interconnected by means of lines.

As illustrated in the drawings, a switching together of two transit-time-containing transmission paths each having an echo suppressor in an exchange which provides an echo suppressor for each of the transmission paths. Therefore, four echo suppressors are present in the total connection of which the echo suppressors normally associated with the lines may be called end echo suppressors and the echo suppressors of the exchange may be called transit echo suppressors.

The two end echo suppressors are completely sufficient for echo suppression and the transit echo suppressors are unnecessary and may cause interferences (interruptions, clipping of syllables). Therefore, the transit echo suppressors of an exchange should be rendered ineffective. This, however, is not always possible since criteria for the switching on and off of the transit echo suppressors must be provided and are not present in some selective systems at the present time.

It is therefore the primary object of this invention to provide a telephone transmission system wherein two speech circuit sections each having an echo suppressor are connected on a four-wire basis by exchange apparatus which also suplies echo suppressors and to provide apparatus for rendering the transit or exchange echo suppressors ineffective for the duration of the telephone connection.

The foregoing object is accomplished according to the present invention in such a way that a switching-off device with a control sound generator and a control sound receiver are provided with the individual echo suppressors. The control sound generator and the control sound receiver are connected to opposite direction transmission paths and the control sound receiver activates the switching off device to switch off the echo suppressor.

These measures will provide that the transit time containing speech circuit sections which are equipped with echo suppressors can be connected in any desired manner, whereby the echo suppressors of the exchange can be switched off in a simple manner for the duration of the telephone connection without applying any additional exchange signals.

In a further development of the invention, two different control sound frequencies are provided in such a manner that the control sound generators of the echo suppressors assigned to the "outgoing" ends of the individual paths and the control sound receivers assigned to the "incoming" ends of the individual paths are tuned to a first frequency $f_1$ and that the control sound generators assigned to the "incoming" ends of the individual paths and the control sound receivers assigned to the "outgoing" ends of the individual paths are tuned to a second frequency $f_2$. Since each transmission path in a four-wire system can be viewed as a transmitting path or a receiving path, the terms "incoming" and "outgoing" are used herein to refer to transmitting and receiving, respectively, as viewed from either connected party.

Therefore, it is provided in a simple manner that immediately after the entire telephone connection is established, the assignment of the individual echo suppressors to an exchange station or a hybrid line can be clearly recognized by the individual switching-off devices.

Figure 1B:
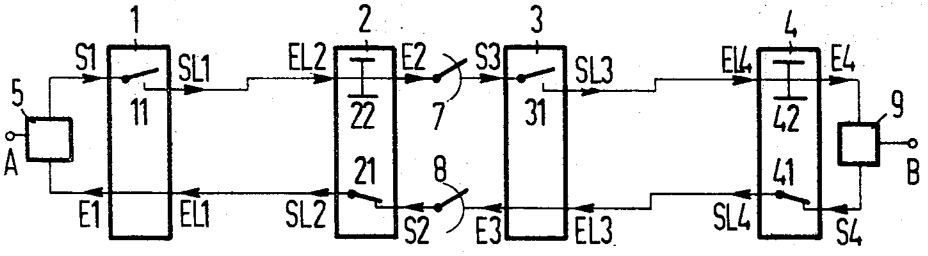
Figure 1C:
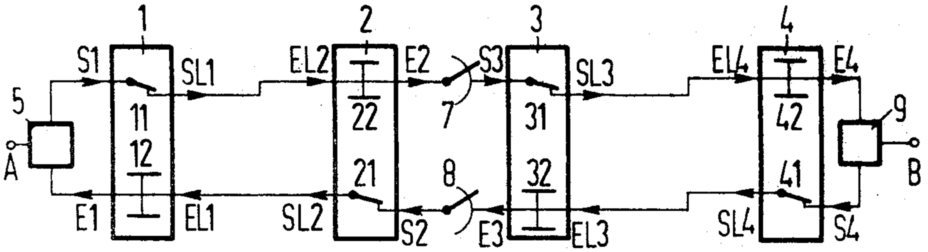
Figure 2:
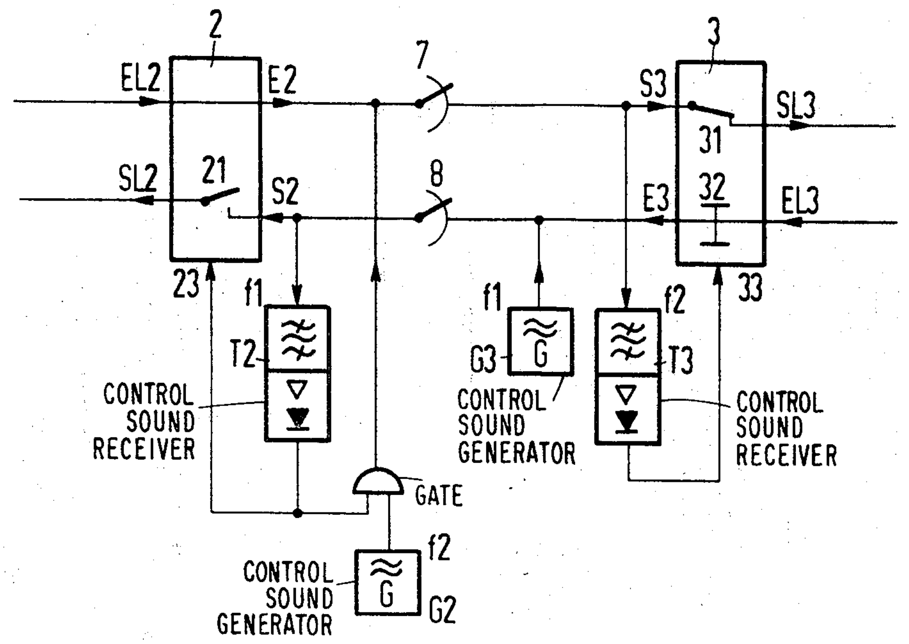
Figure 3:
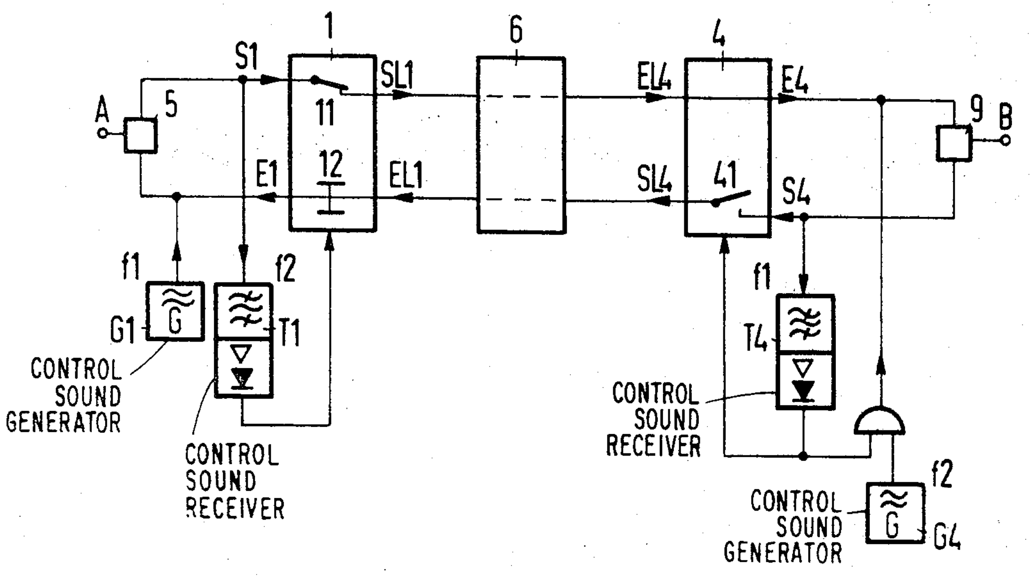

Other objects, features and advantages of the invention, its organization, construction and operation will best be understood from the following detailed description taken in conjunction with the accompanying drawings, in which:

FIGS. 1*a* – 1*c* illustrate in schematic form three switching states of echo suppressors in a telephone connection in which four echo suppressors are connected;

FIG. 2 is a schematic diagram of the echo suppressors of a connection according to FIG. 1 as an example of the two echo suppressors which are included within a telephone exchange; and FIG. 3 is a schematic diagram of the echo suppressors corresponding to FIG. 2 of a connection according to FIG. 1 as an example of two echo suppressors assigned to the transmission lines.

Referring to FIGS. 1*a* – 1*c*, a telephone transmission system is illustrated. The transmission system includes two speech circuit sections which have been switched together, each of the sections having transit times and each equipped at its respective end with an echo suppressor. The telephone connections illustrated extend on a two-wire basis from the subscriber A to the hybrid 5, then on a four-wire basis to the hybrid 9, and then again on a two-wire basis from the hybrid 9 to the subscriber B. Two echo suppressors 1 and 2 are assigned to respective ends of the speech circuit sections and the two echo suppressors 3 and 4 are assigned to respective ends of the second speech circuit section. Since both sections are inserted during the exchange construction of a speech connection between the calling subscriber and the called subscriber, and only in one direction at a time, we can utilize the terms "outgoing" and "incoming" echo suppressors. We thus assume in the following discussion that the subscriber A is the calling subscriber and that the subscriber B is the called subscriber and that therefore the echo suppressors 1 and 3 are seen to be the "outgoing" echo suppressors and the echo suppressors 2 and 4 are seen to be the "incoming" echo suppressors.

The two speech circuit sections are connected in the exchange 6 on a four-wire basis by way of the selection device 7 and 8. As mentioned above, the two transit echo suppressors 2 and 3 are also included in the exchange station 6.

The most common task and mode of efficiency of the echo suppressors is to prevent the speech signals leaving one subscriber in the transit time four-wire paths, and which are reflected partially at the far end of the path, from returning to the speaking subscriber as an echo. Therefore, the echo suppressors, as may be found in the German published application No. 1,297,153, have a transmission path suppressor 11, 21, 31, 41, respectively, in the transmission path S–SL, which separates the transmission path and the respective receiving path EL–E with certain speech levels. Furthermore, the echo suppressors have a double speech evaluation device which is not further illustrated and which, when the level in the transmission path is higher than that in the receiving path, eliminates the effect of the transmission path suppressor 11, 21, 31, 41, respectively, and therefore inserts a damping member 12, 22, 32 or 42, respectively into the receiving path EL-E. The three possible switching states of all echo suppressors have been illustrated in FIGS. 1*a*, 1*b* and 1*c*. Therefore, FIG. 1*a* illustrates the state when the subscriber A speaks alone, FIG. 1*b* illustrates the state when the subscriber B speaks alone, and FIG. 1*c* illustrates the state when both subscribers speak simultaneously. If, according to FIG. 1a, the subscriber A speaks by himself, the speech currents reach the hybrid 9 and the subscriber B via the upper two-wire path S1–E4; echoes cannot flow back since the echo suppressor 4 blocks the transmission path S4–SL4 with the aid of the transmission path suppressor 41. Corresponding situations are true when, according to FIG. 1*b*, the subscriber B is speaking. FIG. 1*c* illustrates the particular case when both subscribers A and B speak simultaneously. According to the invention, in order to switch off the interfering echo suppressors 2 and 3 in the exchange station 6 during the existing telephone connection by way of the selection device 7 and 8, we propose to assign a switching off device to each echo suppressor 1, 2, 3 and 4 with a control sound generator G1, G2, G3 or G4, respectively, which is connected to a transmission direction and a control sound receiver T1, T2, T3, or T4, respectively, which, when the control sound is received, activates the switching off device to switch off the echo suppressor. The corresponding switching off order can therefore be effected by way of the same conductor by which the echo suppressor is rendered ineffective by the exchange station or by a disabler.

FIG. 2 illustrates a simple embodiment of the echo suppressors of a telephone connection according to FIG. 1 and as an example of the two suppressors 2 and 3 assigned to the exchange station 6. The sound receiver T2 of the second echo suppressor 2 is connected to the transmission path S2 on the input side, ahead of the transmission path suppressor 21 and, on one hand, it controls the switching off input 23 of the echo suppressor 2 and a gate, and which the control sound generator G2 is connected to in the "outgoing" path E2 of the echo suppressor 2. The control sound receiver T3 of the echo suppressor 3 is connected to the arriving transmission path S3, and it controls the switching off input 33 of the echo suppressor 3. The sound control generator G3 of the echo suppressor 3 feeds a continuous sound directly into the path E3. Hereby, the control sound receiver T2 and the control sound generator G3 are tuned to a first frequency $f_1 = 12$ kHz, and the control sound generator G2 and the control sound receiver G3 are tuned to a second frequency $f_2 = 10$ kHz.

If the two echo suppressors 2 and 3 are connected with each other in the exchange station 6 via the selection devices 7 and 8, the continuous sound of the control sound generator G3 reaches the control sound receiver T2 via the speech conductors and the selection device 8, so that it reacts and switches off the normal functioning of the echo suppressor 2 by way of the switching off input 23. Simultaneously, the activation of the control sound generator G2 is effected via the gate which then causes the control sound receiver T3 to react via the speech conductors and the selection device 7, which control sound receiver T3 also switches off the normal functioning of the echo suppressor 3 by way of its switching off input 33.

The above-described mode of connecting also provides that a continuous sound is respectively transmitted on the "outgoing" line side, while on the "incoming" side, a sound is only transmitted when an exchange connection is provided. Thus, the frequency ($f_2$) and level of that control sound generator (G2) which is only activated by a control sound receiver (T2) are not critical as long as the frequency ($f_2$) lies only outside of the speech band of 300 through 3,400 Hz of the carrier frequency system.

As can be seen from the arrangement according to FIG. 3, the "outgoing" echo suppressor 1 is on that side of the first path connection which is connected to the hybrid 5 and the subscriber A so that the control sound generator G1 of the echo suppressor 1 sends a continuous sound to the subscriber A. In order to prevent the continuous sound from interfering, the transmission level of the continuously connected control generators G1 and G3 are conditioned comparatively low and the corresponding frequency so high (such as $f_1 = 12$ kHz) that the signal is strongly damped by the end devices. Since the same demands need not be made of the control signal of the control sound generators G2 and G4, as has been mentioned above, the second control frequency is advantageously selected lower than the first control frequency (in this case $f_1 = 10$ kHz).

It is also possible to feed the control sound with the second control frequency at the "incoming" echo suppressors, respectively, and to let it be acknowledged by the "outgoing" echo suppressors. Finally, the control signals might also be sent out opposed to the transmission direction. In this case, the connection of the generators and receivers to the respective two transmission directions would have to be interchanged.

Although we have described our invention by reference to a specific illustrative embodiment, many changes and modifications thereof may become apparent to those skilled in the art without departing from the spirit and scope of our invention, and it is to be understood that we intend to include within the patent warranted hereon all such changes and modifications as may reasonably and properly be included within the scope of our contribution to the art.

We claim:

1. A telecommunication transmission system comprising: first and second stations connected by a four-wire transmission circuit having two transmission paths, each of said stations including in said transmission paths a receiving speech circuit and a transmitting speech circuit connected to the transmitting speech circuit and the receiving speech circuit, respectively, of the other said station; first, second, third and fourth echo suppressors connected in each transmission path of said four-wire circuit, each of said echo suppressors including a control input, a transmission suppressor in one transmission path operated upon receipt of a control signal at said control input and a damping member connected in the other transmission path upon operation of the respective transmission suppressor, the first and third echo suppressors having their transmission suppressors connected in the transmission path which is connected to the transmitting speech circuit of said first station, the second and fourth echo suppressors having their transmission suppressors connected in the transmission path which is connected to the transmitting speech circuit of said second station, each of said echo supressors including a control tone generator and a control tone receiver connected to the respective control input, first and second gates each having two inputs and an output, said control tone generator of said third echo suppressor connected to the transmission path including said transmitting circuit of said second station, said control tone receiver of said second echo suppressor connected to the last-mentioned path and operated in response to receipt of the control tone of the control tone generator of said third echo suppressor, said control tone generator of said second echo suppressor and said control tone receiver of said second echo suppressor connected to respective inputs of said first gate, the output of said first gate connected to the transmitting path including said transmitting speech circuit of said first station, said control tone receiver of said third echo suppressor connected to the last-mentioned path and operated in response to receipt of the control tone from said control tone generator of said second echo suppressor, said control tone generator of said first echo suppressor connected to the transmission path including the transmitting speech circuit of said second station and at a point adjacent the hybrid circuit for said first station, said control tone receiver of said fourth echo suppressor connected to the last-mentioned path at a point adjacent the hybrid circuit for said second station and operated in response to receipt of the control tone of said control tone generator of said first echo suppressor, said control tone receiver and said control tone generator of said fourth echo suppressor connected to respective inputs of said second gate, the output of said second gate connected to the transmission path including the transmitting speech circuit of said first station at a point adjacent said hybrid circuit which is connected to said second station, said control tone receiver of said first echo suppressor connected to the last-mentioned transmission path at a point adjacent said hybrid which is connected to said first station and operated in response to receipt of the control tone of said control tone generator of said fourth echo suppressor.

2. The telecommunication transmission system set forth in claim 1, wherein two separate control tone frequencies are employed, said control tone generators of said first and third echo suppressors providing a tone signal of a first frequency, said control tone receivers of said second and fourth echo suppressors operated in response to said first frequency, said control tone generators of said second and fourth echo suppressors providing a second frequency, and said control tone receivers of said first and third echo suppressors operated in response to said second frequency.

3. The telecommunication transmission system set forth in claim 1, wherein the frequency of the control tone generators of said first and third echo suppressors are higher than that of the control tone generators of said second and fourth echo suppressors.

* * * * *